(12) United States Patent
Marchya et al.

(10) Patent No.: US 10,354,623 B1
(45) Date of Patent: Jul. 16, 2019

(54) ADAPTIVE BUFFER LATCHING TO REDUCE DISPLAY JANKS CAUSED BY VARIABLE BUFFER ALLOCATION TIME

(71) Applicant: QUALCOMM Incorporated, San Diego, CA (US)

(72) Inventors: Dileep Marchya, Hyderabad (IN); Balamukund Sripada, Hyderabad (IN); Srinivas Pullakavi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/860,296

(22) Filed: Jan. 2, 2018

(51) Int. Cl.
*G09G 5/36* (2006.01)
*G09G 5/395* (2006.01)
*G06F 12/02* (2006.01)
*G06F 12/1027* (2016.01)
*G09G 5/00* (2006.01)
*G06T 1/20* (2006.01)
*G06T 1/60* (2006.01)

(52) U.S. Cl.
CPC ........... *G09G 5/395* (2013.01); *G06F 12/023* (2013.01); *G06F 12/1027* (2013.01); *G06T 1/20* (2013.01); *G06T 1/60* (2013.01); *G09G 5/001* (2013.01); *G06F 2212/1044* (2013.01); *G06F 2212/68* (2013.01); *G09G 2360/12* (2013.01); *G09G 2360/18* (2013.01)

(58) Field of Classification Search
CPC ...... G09G 5/363; G09G 2360/18; G09G 5/39; G09G 5/397; G09G 5/399; G06T 1/60
See application file for complete search history.

(56) References Cited

U.S. PATENT DOCUMENTS

| | | | |
|---|---|---|---|
| 6,366,970 B1 | 4/2002 | Wolff et al. | |
| 6,567,091 B2 | 5/2003 | Dye et al. | |
| 7,336,283 B2 | 2/2008 | McCormack et al. | |
| 2011/0134132 A1* | 6/2011 | Wolf | G06F 9/5027 345/502 |
| 2016/0231869 A1 | 8/2016 | Kumar | |
| 2017/0262952 A1 | 9/2017 | Sama | |
| 2017/0316541 A1* | 11/2017 | Kim | G06F 9/451 |
| 2018/0012570 A1* | 1/2018 | Hu | G06F 3/1423 |

* cited by examiner

*Primary Examiner* — Hau H Nguyen
(74) *Attorney, Agent, or Firm* — Shumaker & Sieffert, P.A.

(57) ABSTRACT

A device may allocate one or more frame buffers. In response to a command to open an application after allocating the one or more frame buffers, the device may reassign one or more of the frame buffers to the application. Furthermore, the device may store, based on instructions of the application, content data in the one or more reassigned frame buffers. The device may output, for display on a display screen, content based on the content data in the one or more reassigned frame buffers.

22 Claims, 6 Drawing Sheets

ADAPTIVE BUFFER LATCHING TO REDUCE DISPLAY JANKS CAUSED BY VARIABLE BUFFER ALLOCATION TIME

TECHNICAL FIELD

This disclosure relates to devices and techniques for display processing.

BACKGROUND

Modern mobile devices such as smartphones and tablet computers enable users to quickly switch between multiple applications. For example, a user may switch back and forth between a video sharing application and a social media application. When an application running on a device becomes active (i.e., when the device displays an interface of the application), the application is said to be in the "foreground." Otherwise, the application is said to be in the "background." When an application is in the foreground, application manager of the device typically allocates three frame buffers in a memory to the application.

A display device updates displayed content according to a synchronization cycle (i.e., a sync cycle). For each sync cycle while an application is active, a device writes updated content data to a different one of the frame buffers allocated to the application. The content data comprises pixel values for display on the display device. Additionally, for each sync cycle while the application is active, the display device uses the content data stored in one of the frame buffers to display a frame. For example, during a first sync cycle, the display device may use content data stored in a first frame buffer to display a first frame while the device writes content data for an active application to a third frame buffer. In this example, during a second sync cycle, the display device may use content data stored in a second frame buffer to display a second frame while the host device writes content data for the active application to the first frame buffer. In this example, during a third sync cycle, the display device may use content data stored in the third frame buffer to display a third frame while the host device writes content data for the active application to the second frame buffer. This process may continue cycling through the frame buffers in this manner while the application remains active.

SUMMARY

In general, this disclosure describes techniques to improve display processing when launching applications or transitioning between applications. When a host device launches and application or returns the application to the foreground, the host device may be required to allocate space in memory for frame buffers of the application. As time goes on and the host device allocates and deallocates space in memory, the space in memory that can be allocated for use as frame buffers may become increasingly fragmented. That is, there may no longer be ranges of consecutive memory locations large enough to fit any of the frame buffers. Thus, when the host device performs a memory allocation process to allocate memory for the frame buffers of an application, the host device must search for smaller chunks of unallocated space in memory to use for storing the frame buffers. However, the time required for performing the memory allocation process may increase non-linearly as space in memory becomes increasingly fragmented. Because of the amount of time required by the memory allocation process to allocate a buffer may increase as memory becomes increasingly fragmented, an application may not be able to fill the buffer with content data by the time the content data in the buffer to schedule for display. The result is user-noticeable delays and/or discontinuities, which are commonly referred to as "janks."

This disclosure describes techniques in which a computing device reassigns frame buffers between applications without deallocating and reallocating memory space for the memory buffers. For example, the computing device may assign a set of frame buffers to a first application. In this example, when the computing device launches a second application, the computing device may reassign the frame buffers to the second application without deallocating and reallocating the memory space of the frame buffers. If there are multiple applications to which the computing device has assigned frame buffers, the computing device performs a process to determine which of the applications will have its frame buffers reassigned to the newly-launched application.

If most of the content data in a first application's frame buffers are different when the first application is relaunched or if the first application is unlikely to be relaunched soon, there may be little need for the frame buffers to remain assigned to the first application. This is because the content data in the first application's frame buffers is unlikely to be ever output for display and the first application would need to refill the frame buffers anyway. Hence, in accordance with a technique of this disclosure, the computing device may reassign one or more of frame buffers from the first application to a second application, without deallocating and reallocating the memory space of the frame buffers. The second application may then store content data into the frame buffers. Thus, time is not consumed by performing a new memory allocation process. However, if most of the content data in the frame buffers assigned to the first application is likely to be the same when the first application is relaunched or if the first application is likely to be relaunched soon, the first application may be relaunched faster if the content data in the frame buffers allocated to the first application remains in the frame buffers.

Thus, in accordance with a technique of this disclosure, the computing device uses a machine learning model that predicts future reutilization of buffer content. The machine learning model is trained based on data regarding rendering activity performed when individual applications are relaunched.

In one example, this disclosure describes a method comprising: allocating, by a computing device, one or more frame buffers; and in response to a command to open an application after allocating the one or more frame buffers: reassigning, by the computing device, one or more of the frame buffers to the application; storing, by the computing device, based on instructions of the application, content data in the one or more reassigned frame buffers; and outputting, by the computing device for display on a display screen, content based on the content data in the one or more reassigned frame buffers.

In another example, this disclosure describes a device comprising: a memory; and processing circuitry configured to: allocate one or more frame buffers; and in response to a command to open an application after allocating the one or more frame buffers: reassign one or more of the frame buffers to the application; store, based on instructions of the application, content data in the one or more reassigned frame buffers; and output, for display on a display screen, content based on the content data in the one or more reassigned frame buffers.

In another example, this disclosure describes a device comprising: means for allocating one or more frame buffers; and means for, in response to a command to open an application after allocating the one or more frame buffers: reassigning one or more of the frame buffers to the application; storing based on instructions of the application, content data in the one or more reassigned frame buffers; and outputting, for display on a display screen, content based on the content data in the one or more reassigned frame buffers.

In another example, this disclosure describes a computer-readable data storage medium having instructions stored thereon that, when executed, cause a device to: allocate one or more frame buffers; and in response to a command to open an application after allocating the one or more frame buffers: reassign one or more of the frame buffers to the application; store, based on instructions of the application, content data in the one or more reassigned frame buffers; and output, for display on a display screen, content based on the content data in the one or more reassigned frame buffers.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Visual artifacts called "janks" may occur when switching between applications because delays in allocating memory locations of frame buffers may result in there being insufficient time for the switched-to application to store data into a frame buffer prior to an output time for content data in the frame buffer. Techniques of this disclosure may address this issue, resulting in a potentially smoother experience. For instance, in accordance with a technique of this disclosure, a computing device may assign frame buffers to a plurality of applications. In response to a command to open a first application in addition to the plurality of applications, the computing device selects, based on statistics regarding reuse of content data in the frame buffers assigned to the plurality of applications, an application from among the plurality of applications. Furthermore, the computing device reassigns, one or more of the frame buffers from the selected application to the first application. The computing device may store, based on instructions of the first application, content data in the one or more reassigned frame buffers. Additionally, the computing device may display, on a display screen, display content based on the content data in the one or more reassigned frame buffers. Thus, by intelligently reassigning frame buffers, as opposed to allocating free memory locations for the frame buffers, the computing device may be able to avoid the delays associated with allocating memory locations for the frame buffers.

Figure 1:
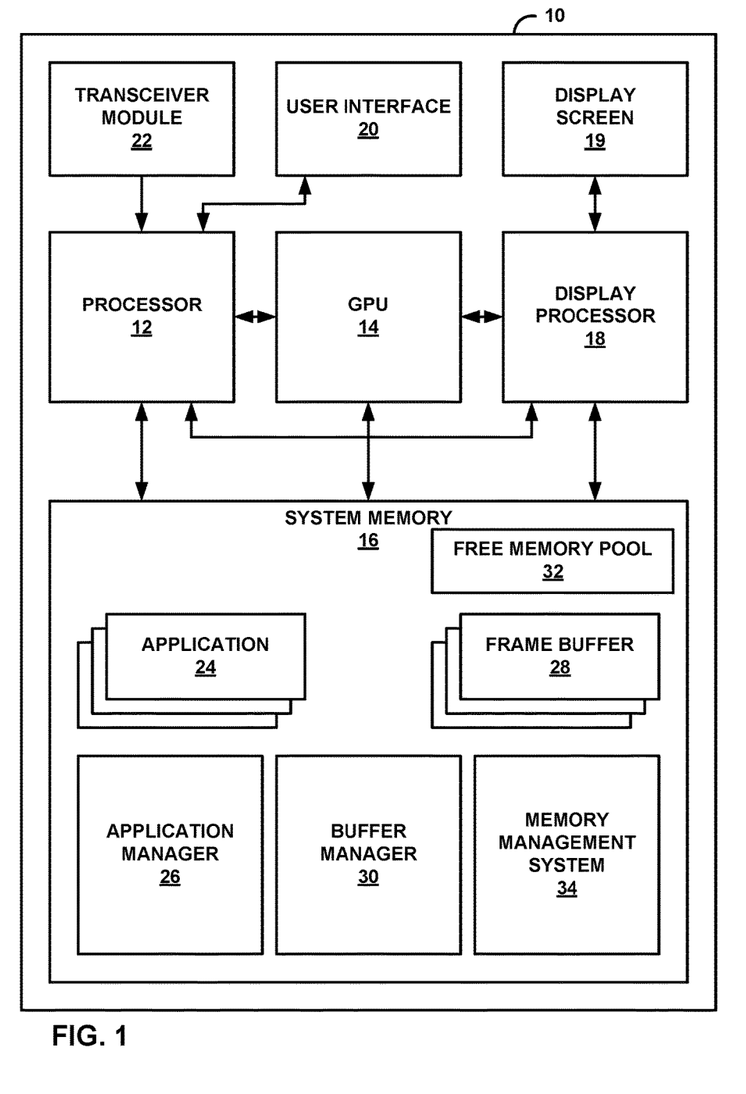
FIG. 1 is a block diagram illustrating an example device for image display in accordance with one or more example techniques described in this disclosure.

FIG. 1 is a block diagram illustrating an example device for image display in accordance with one or more example techniques described in this disclosure. FIG. 1 illustrates device 10, examples of which include, but are not limited to, video devices such as media players, set-top boxes, wireless handsets such as mobile telephones (e.g., so-called smartphones), personal digital assistants (PDAs), desktop computers, laptop computers, gaming consoles, video conferencing units, tablet computing devices, and the like.

In the example of FIG. 1, device 10 includes processor 12, graphics processing unit (GPU) 14, system memory 16, display processor 18, display screen 19, user interface 20, and transceiver module 22. In examples where device 10 is a mobile device, display processor 18 comprises display composer hardware. In some examples, such as examples where device 10 is a mobile device, processor 12, GPU 14, and display processor 18 may be formed as an integrated circuit (IC). For example, the IC may be considered as a processing chip within a chip package, and may be a system-on-chip (SoC). In some examples, two of processors 12, GPU 14, and display processor 18 may be housed together in the same IC and the other in a different integrated circuit (i.e., different chip packages) or all three may be housed in different ICs or on the same IC. However, it may be possible that processor 12, GPU 14, and display processor 18 are all housed in different integrated circuits in examples where device 10 is a mobile device.

Examples of processor 12, GPU 14, and display processor 18 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 comprises specialized hardware that includes integrated and/or discrete logic circuitry that provides GPU 14 with massive parallel processing capabilities suitable for graphics processing. In some instances, GPU 14 also includes general purpose processing capabilities, and may be referred to as a general-purpose GPU (GPGPU) when implementing general purpose processing tasks (i.e., non-graphics related tasks). Display processor 18 may also be specialized integrated circuit hardware that is designed to retrieve image content from system memory 16, compose the image content into an image frame, and output the image frame to display screen 19.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing based on and instructions or commands that processor 12 transmits to GPU 14.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 is a memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some examples, system memory 16 includes instructions that cause processor 12, GPU 14, and/or display processor 18 to perform the functions ascribed in this disclosure to processor 12, GPU 14, and/or display processor 18. Accordingly, system memory 16 may be a computer-readable storage medium having instructions stored thereon that, when executed, cause one or more processors (e.g., processor 12, GPU 14, and/or display processor 18) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

In the example of FIG. 1, system memory 16 stores instructions for a plurality of applications 24, application manager 26, buffer manager 30, and a memory management system 34. In some examples, application manager 26 may be termed a window manager. Processor 12 may execute the instructions of applications 24 to run applications 24 on device 10. Similarly, processor 12 may execute instructions of application manager 26 to run application manager 26 on device 10. In some examples, application manager 26 and/or memory management system 34 form parts of an operating system of device 10. The operating system of device 10 manages hardware and software resources of device 10 and provides common services for computer programs, such as applications 24. In other examples, application manager 26 and/or memory management system 34 is separate from the operating system of device 10. Common types of applications may include web browser applications, social media applications, messaging applications, video sharing applications, news reading applications, media streaming applications, and so on.

Applications 24 generate content data comprising pixel values. For example, a web browser application may generate content data comprising pixel values for a webpage and content data comprising pixel values for user interface controls (e.g., a back button, a settings button, an address bar, etc.).

Each of applications 24 is either in the foreground or in the background. One or more of applications 24 may concurrently be in the foreground and one or more of applications 24 may concurrently be in the background. When an application is in the foreground, display screen 19 displays content of the application. When an application is in the background, display screen 19 does not display content of the application. In other words, when the application is in the background, the application is detached from a display pipeline. The display pipeline may comprise hardware and/or software that prepare content data for display on display screen 19. For instance, the display pipeline may include display processor 18. When an application is detached from the display pipeline, the display pipeline does not output for display content data based on content data generated by or for the application. When an application is attached to the display pipeline, the display pipeline output for display content data based on content data generated by or for the application.

Application manager 26 may switch which of applications 24 are in the foreground and which of applications 24 are in the background in response to indications of user input. For example, application manager 26 may put an application in the foreground in response to receiving an indication of user input to launch the application. In another example, application manager 26 may put a first application into the background in response to receiving an indication of user input to launch a second application. In another example, application manager 26 may put an already-running first application into the background in response to an indication of user input to switch from the first application to an already-running second application, which application manager 26 then puts into the foreground.

In some examples, when application manager 26 puts one of applications 24 into the foreground (i.e., when application manager 26 opens the application), application manager 26 requests one or more frame buffers from buffer manager 30. In response, buffer manager 30 may request memory management system 34 allocate one or more frame buffers 28 in system memory 16. Buffer manager 30 may then assign the one or more of frame buffers 28 to the opened application. Each of frame buffers 28 may contain enough memory locations to store pixel values for all of display screen 19. When memory management system 34 allocates frame buffers 28, memory management system 34 identifies memory locations in a free memory pool 32 for use as frame buffers 28, thereby removing the identified memory locations from free memory pool 32. In some examples, when application manager 26 puts particular applications into the background (i.e., relegates the application), buffer manager 30 instructs memory management system 34 to deallocate certain memory locations, such as camera preview buffers and video decoder buffers, thereby returning the memory locations to free memory pool 32.

An open application stores content data into the frame buffers assigned to the opened application. Display processor 18 reads content data from a frame buffer assigned to the open application and processes the content data for display on display screen 19. For instance, display processor 18 may generate composite content data based on the content data read from the frame buffer and content data generated by application manager 26 or other applications 24 to generate a final set of content data for display on display screen 19.

As mentioned above, application manager 26 may request buffer manager 30. In response, buffer manager 30 may request memory management system 34 allocate frame buffers 28 from free memory pool 32. For example, each frame buffer may be 1 MB. Accordingly, in this example, buffer manager 30 may allocate 1 MB worth of consecutive physical memory locations for use as the frame buffer. However, in this example, there might not be 1 MB worth of consecutive physical memory locations available in free memory pool 32 of system memory 16. Accordingly, in this example, buffer manager 30 may piece together the 1 MB worth of physical memory locations from two or more smaller sets of physical memory locations (e.g., a 250 KB segment, a 550 KB segment, and a 200 KB segment). However, to keep things simple for the application, buffer manager 30 designates a range of contiguous virtual memory addresses that the application may use to refer to memory locations of the frame buffer. In some examples, buffer manager 30 creates an address translation table that maps the virtual memory addresses to the physical memory segments that make up the frame buffer. As memory locations are allocated and deallocated, the sizes of the available segments of physical memory locations may decrease. In other words, the free, unallocated memory may become increasingly fragmented.

The process of allocating frame buffers 28 may take a variable amount of time because memory management software 34 may need to search for available segments of physical memory locations in free memory pool 32 of system memory 16. Because the amount of time required by memory management software 34 to allocate a frame buffer may increase as system memory 16 becomes increasingly fragmented, an application may not be able to fill the frame buffer with content data by the time display processor 18 is scheduled to read the content data in the frame buffer. The result may be user-noticeable delays, which are commonly referred to as "janks," when frame processing takes longer than a vsync time (e.g., ~16 milliseconds for 60 Hz display panels). Display processor 18 may read content data from a frame buffer once per vsync period.

This disclosure describes techniques in which device 10 reassigns frame buffers 28 between applications 24 without deallocating and reallocating memory space for frame buffers 28. In accordance with a technique of this disclosure, buffer manager 30 may assign a set of frame buffers to a first application. In this example, when application manager 26 opens a second application, buffer manager 30 may reassign the frame buffers to the second application without deallocating and reallocating the memory locations of the frame buffers. If there are multiple applications to which buffer manager 30 has assigned frame buffers, buffer manager 30 performs a process to determine which of the applications will have its frame buffers reassigned to the newly-opened application. The second application may then store content data in the one or more reassigned frame buffers. Display screen 19 may display content based on the content data in the one or more reassigned frame buffers. Buffer manager 30 may write over or erase content data stored in frame buffers 28 when buffer manager 30 reassigns frame buffers 28.

If most of the content data in a first application's frame buffers are different when the first application is relaunched or if the first application is unlikely to be relaunched soon, there may be little need for the frame buffers to remain assigned to the first application. This is because the content data in the first application's frame buffers are unlikely to be ever output for display and the first application would need to refill the frame buffers anyway. For example, if Application XYZ has 10% of buffer re-rendered upon relaunch and Application ABC has 75% of the content re-rendered, Application ABC has majority of content redone, so likely claiming buffers from Application ABC may be more economical. Hence, in accordance with a technique of this disclosure, buffer manager 30 may reassign one or more of frame buffers from the first application to the second application, without deallocating and reallocating the memory locations of the frame buffers. To reassign a frame buffer, buffer manager 30 may update an address translation table such that virtual memory addresses used by the opened application correspond to physical memory addresses of the frame buffer. The second application may then store content data into the frame buffers. Thus, unpredictable amounts of time are not consumed by performing a new memory allocation process. However, if most of the content data in frame buffers 28 assigned to the first application is likely to be the same when the first application is relaunched or if the first application is likely to be relaunched soon, the first application may be relaunched faster if the content data in frame buffers 28 assigned to the first application remains in the frame buffers.

In accordance with a technique of this disclosure, buffer manager 30 may select, based on statistics regarding reuse of content data in the frame buffers assigned to a plurality of applications, an application from among the plurality of applications. Buffer manager 30 may then reassign one or more of the frame buffers from the selected application to a newly-opened application.

Furthermore, in some examples, buffer manager 30 requests memory management system 34 to allocate memory locations from free memory pool 32 for new frame buffers and buffer manager 30 may then assign the newly-allocated frame buffers to the first application as part of the process of reassigning the first application's frame buffers to the second application. In such examples, buffer manager 30 may update an address translation table such that virtual memory addresses used by the first application to refer to the frame buffers may correspond to physical memory addresses of the newly-allocated frame buffers. In this way, buffer manager 30 may claim the least reutilized frame buffers for an active application's immediate need and exchanged with a parallel allocation. In other examples, buffer manager 30 does not request allocation of memory locations for new frame buffers for the first application as part of the process of reassigning the first application's frame buffers to the second application.

In some examples, buffer manager 30 uses a machine learning model to select the application predicts future reutilization of buffer content. Buffer manager 30 may train the machine learning model based on statistics regarding reuse of content data in frame buffers 28 assigned to applications 24. For instance, the statistics may include a probability of a respective application being a next one of applications 24 to be reopened when a first application is attached to the display pipeline, the statistics may include how much time has elapsed following a most recent time content data was rendered in the frame buffers assigned to a respective application, statistics may include a probability of a next state of a GUI of a respective application, as stored in the frame buffers, the statistics may include data regarding a size of a rendering area of the next state of the GUI of the respective application, and so on. In some examples, the data used for training the machine learning model includes:

1) A percentage of area of rendering that happens again for each frame buffer of a 3 frame buffer pool just after relaunch.
2) Application relaunch frequency (e.g., how many times in a day or other time period an application is used and in what order).
3) Likelihood of a first application being used when navigating a second application (e.g., while viewing a message in a messaging application, there is an embedded video, it may be likely that a video player application will be launched).

Based on this data, the machine leaning model may predict what applications from which to reassign frame buffers. For instance, if a video player application is frequently used with a messaging application, even though the video player application does full rendering upon relaunch, it may be worth not claiming video player buffers, and instead claim from the application which may not be launched here.

In some examples, buffer manager 30 uses a probabilistic approach across applications 24. In examples where buffer manager 30 uses the probabilistic approach across applications 24, buffer manager 30 trains the machine learning model based on rendering statistics collected for all frame buffers of an application upon relaunch of the applications. The machine learning model may cluster applications that have similar buffer attributes and are operated in a mutually exclusive manner.

In other examples, buffer manager 30 uses a probabilistic approach within a display subsystem. For instance, during each refresh cycle, buffer manager 30 may identify a set of layers. Each of the identified layers is associated with a frame buffer containing content data to be displayed during the current refresh cycle. Buffer manager 30 may then request a composition hardware abstraction layer to determine how to compose the identified layers into a single set of content for display on display screen 19. The process of composing layers comprises composing content data in the associated frame buffers containing content data to be displayed during the current refresh cycle. The composition hardware abstraction layer may determine, based on characteristics of GPU 14 and display processor 18, a composition mode to use for composing the identified layers.

In some examples, there are two mutually-exclusive composition modes: GPU mode and display overlay mode. In the display overlay mode, display processor 18 composes the identified layers without the assistance of GPU 14 or use of additional buffers for composition. However, when a composition requirement exceeds display hardware capabilities of display processor 18 (e.g., layer scaling is above a limit), the GPU mode may be used.

In the GPU mode, display software (e.g., buffer manager 30, software running on display processor 18, or another software system) may request GPU 14 to compose some or all of the identified layers. In some examples, the display software uses a graphics API, such as OpenGL, to request GPU 14 compose the layers. Furthermore, in the GPU mode, display processor 18 may compose the layers composed by GPU 14 with any remaining layers and may then transfer final content data to display screen 19. To achieve this, buffer manager 30 may reserve a buffer pool of 2-3 buffers (i.e., GPU-mode buffers) so that runtime output of GPU composition can be written out in GPU-mode buffers. When display processor 18 handles entire composition, the GPU-mode buffers are idle. In accordance with the probabilistic approach within the display subsystem, display processor 18 may use the GPU-mode buffers for interim requirements while buffer manager 30 assigns frame buffers to launched applications. In such examples, buffer manager 30 may train a machine learning model based on composition statistics from all buffers which are in direct control of display processor 18 (e.g., the GPU-mode buffers). Additionally, buffer manager 30 may use the machine learning model to determine whether to assign one or more of GPU-mode buffers for use as one or more frame buffers assigned to an opened application.

In some examples, applications 24 may use GPU 14 to generate content data. For instance, an application may use GPU 14 for rendering 3-dimensional graphics, blending textures, and so on. In some examples, the content data generated by GPU 14 for an application is all of the content data that needs to be output for display, such as when the application is a full-screen game that uses 3-dimensional graphics. In some examples, display processor 18 and/or GPU 14 uses content data generated by GPU 14 as one layer and composes the content data generated by GPU 14 with one or more other layers to generate content data for display on display screen 19. Each of the layers may comprise content data generated by an operating system of device 10, the application itself, or other applications. Thus, in some examples, display processor 18 may operate in conjunction with GPU 14 for blending various layers. In such examples, a composition may be handled completely by display processor 18, or GPU 14, or a mix of the two.

In examples where an application uses GPU 14 to generate content data, GPU 14 may use frame buffers for generating and storing content data for the application. This disclosure may refer to such buffers as GPU-utilized frame buffers. The GPU-utilized frame buffers for the application may be separate from other frame buffers assigned to the application. For example, buffer manager 30 may assign a first set of one or more frame buffers to an application and a second set of one or more frame buffers to the application. In this example, the application may store content data for a first layer in the first set of frame buffers. Furthermore, in this example, in response to instructions from the application, GPU 14 may store content data for a second layer in the second set of frame buffers. In this example, display processor 18 may compose the first and second layers into a single set of content data for display on display screen 19. In some examples, one or more of the GPU-utilized frame buffers are in system memory 16. In other examples, one or more of the GPU-utilized frame buffers are in a separate memory, such as an on-board memory of GPU 14.

In accordance with a technique of this disclosure, when the "GPU-utilized frame buffers" are in a memory of GPU 14, buffer manager 30 may reassign the GPU-utilized frame buffers between applications, for use as GPU-utilized frame buffers, in much the same way described elsewhere in this disclosure. In other words, the GPU-utilized frame buffers may remain GPU-utilized frame buffers, but for use when the GPU is generating content data for a different application.

In some examples, buffer manager 30 reassigns GPU-mode buffer or GPU-utilized frame buffers for use in storing content data generated by other applications. Thus, a GPU-mode buffer or a GPU-utilized frame buffer may stop being a GPU-mode buffer or a GPU-utilized frame buffer, and instead may be used directly by an application. Conversely, buffer manager 30 may reassign a frame buffer used by a first application to being a GPU-utilized frame buffer used by GPU 14 for storing GPU-generated data for a second application or may reassign a frame buffer used by a first application to being to being a GPU-mode buffer.

As in other examples described in this disclosure, buffer manager 30 may use a machine learning model to select GPU-mode buffers or GPU-utilized frame buffers for background application to reassign to other applications, either as GPU-utilized frame buffers or non-GPU-utilized frame buffers. Buffer manager 30 may train the machine learning model based on statistics similar to those discussed elsewhere in this disclosure. For instance, buffer manager 30 may train the machine learning model based on statistics regarding a probability of the respective application being a next one of the plurality of applications to be relaunched when the first application is attached to the display pipeline, statistics include how much time has elapsed follow a most recent time content data was rendered in the frame buffers assigned to the respective application, and statistics include a probability of a next state of a GUI of the respective application, as stored in the GPU-utilized frame buffers, and statistics regarding a size of a rendering area of the next state of the GUI of the respective application, as stored in the GPU-utilized frame buffers. Training the machine learning model on such statistics may result in buffer manager 30 selecting GPU-utilized frame buffers containing content unlikely to be reused in the near future.

When an application is opened, application manager 26 may provide to the application a memory pointer whose value is a virtual memory address of a first memory location of a frame buffer. For instance, when application manager 26 launches an application, application manager 26 may invoke a function of buffer manager 30 that returns a reference, such as a memory pointer, to memory locations for use as the frame buffer. Application manager 26 may then provide the reference to the application. The application may regard the frame buffer as a contiguous set of memory locations starting from the first memory location of the frame buffer. This process may be repeated for each of the frame buffers used by the application. In some examples, invocation of the function of buffer manager 30 may return references to multiple frame buffers. GPU 14 may also perform a similar process to obtain frame buffers.

Buffer manager 30 may maintain an address translation table that maps memory addresses (i.e., virtual memory addresses) provided to the application or GPU 14 to addresses of physical memory locations (i.e., physical memory addresses) in system memory 16. Thus, when buffer manager 30 requests memory management system 34 perform the memory allocation process to allocate memory for a frame buffer, the virtual memory addresses of the frame buffer may be contiguous, but the corresponding physical memory addresses may be divided into several non-contiguous segments. The existence of the address translation table does not impact how the application or GPU 14 operates. Hence, buffer manager 30 may change which physical memory addresses are mapped to the virtual memory addresses of a frame buffer without the application or GPU 14 being aware.

In accordance with a technique of this disclosure, buffer manager 30 may determine whether an opened application is likely to use GPU 14. In other words, buffer manager 30 may predict display composition exclusion with GPU 14, in the sense that buffer manager 30 may predict that GPU-mode composition is not going to be used when the application is in the foreground. If GPU 14 is unlikely to be used for composition when the opened application is in the foreground, buffer manager 30 may reassign one or more GPU-mode buffers for use as the frame buffers for the opened application. This disclosure may refer to a reassigned GPU-mode buffer as a repurposed frame buffer because the GPU-mode buffer is being repurposed for use by the application. To perform this reassignment, buffer manager 30 may specify in the address translation table that virtual memory addresses used by the application to refer to memory locations in a frame buffer correspond to physical memory locations in the repurposed frame buffer. The opened application may then write content data to the repurposed frame buffer.

Additionally, in accordance with this technique, buffer manager 30 may perform the following for each frame buffer of the application. First, buffer manager 30 may request memory management system 34 perform a memory allocation process to allocate physical memory addresses for memory locations in free memory pool 32 for use as a new frame buffer for the opened application. Second, after memory management system 34 has allocated the physical memory addresses for use as the new frame buffer for the application, after display processor 18 has read content data from the repurposed frame buffer but before the application writes new content data to the repurposed frame buffer, buffer manager 30 may update the address translation table such that the virtual memory addresses used by the application for the respective frame buffer are now mapped to the newly-allocated physical memory addresses for the respective frame buffer instead of the physical memory addresses of the repurposed frame buffer.

Subsequently, a GPU-mode buffer may revert to its original purpose. For instance, GPU 14 may use the GPU-mode buffer again for composing layers. In this way, the opened application may begin storing data into the previously-GPU mode buffer while memory management system 34 is still in the process of allocating the memory locations for the frame buffers for the opened application.

Devices implementing techniques of this disclosure have several potential advantages. For example, launch latency for many applications may be reduced as initial set of buffers required for rendering will be handy. Launch latency for new applications may be at par with the applications which are in background. Furthermore, display operations like animation, rotation, etc. may be fluid, especially when memory gets fragmented.

In addition, many value-tier smartphones have a small RAM which limits the number of applications that can be retained in background. In devices implementing techniques of this disclosure, background applications do not need to retain their frame buffers. Hence, more applications can stay in background with the techniques of this disclosure. This may reduce launch latency for the applications which usually get closed because of low memory.

Furthermore, the techniques of this disclosure may reduce memory fragmentation because the memory allocation/deallocation previously associated closing applications may be minimized. In addition, collective memory requirements of various applications may be reduced, which may let other services use the residual memory. In some examples, original equipment manufacturers (OEMs) may be can reduce the product RAM size while supporting same number of applications. This may benefit Internet of Things (IoT) products.

Following table illustrates frame rate improvement in a frames per second (FPS) measurement application when content is animated in a simulated fragmented memory state where each animation (display) buffer allocation consumed ~20 milliseconds (ms).

| Number of layers | Expected FPS | Current FPS | Invention FPS |
| --- | --- | --- | --- |
| 1 | 59.98 | 58.17 | 59.92 |
| 2 | 59.84 | 56.15 | 59.73 |
| 3 | 59.97 | 53.98 | 59.90 |
| 4 | 59.96 | 52.36 | 59.89 |

Following table illustrates application launch latency and initial frame rate improvement when an application is launched in a simulated fragmented memory state where each application buffer allocation consumed ~20 milliseconds.

| Application Name | Current latency | Current Initial FPS | Invention latency | Invention Initial FPS |
|---|---|---|---|---|
| [Application 1] | 353 | 57.62 | 332 | 59.66 |
| [Application 2] | 297 | 56.15 | 275 | 59.08 |
| [Application 3] | 316 | 56.78 | 294 | 58.46 |
| [Application 4] | 349 | 57.16 | 328 | 59.34 |

Figure 2:
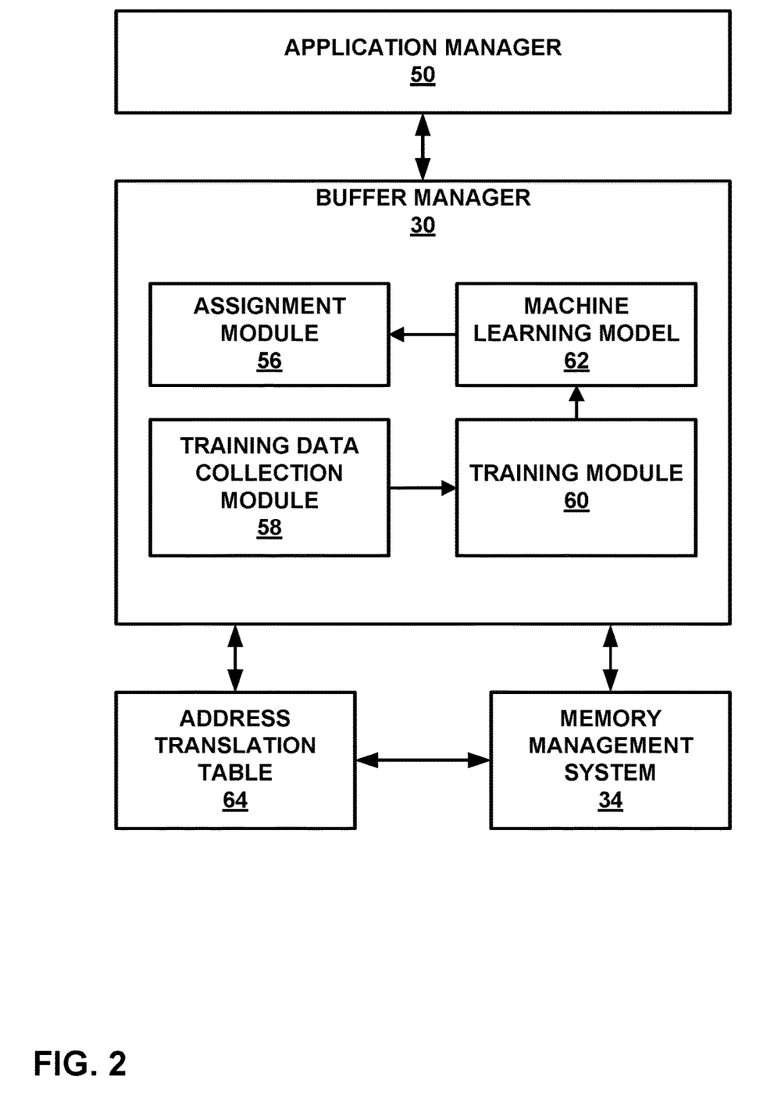
FIG. 2 is a block diagram illustrating example components of the device, in accordance with a technique of this disclosure.

FIG. 2 is a block diagram illustrating example components of device 10, in accordance with a technique of this disclosure. In the example of FIG. 2, device 10 comprises application manager 26, buffer manager 30, and memory management system 34. Buffer manager 30 comprises an assignment module 56, a training data collection module 58, a training module 60, and a machine learning (ML) model 62.

Application manager 26 may open applications. For instance, application manager 26 may launch applications (i.e., start running applications). In addition, application manager 26 may facilitate switching applications between foreground to background. In some examples, application manager 26 may be responsible for generating a launcher GUI that allows a user to select an application to launch. The launcher GUI may comprise a grid of icons corresponding to different applications. In some examples, application manager 26 may also be responsible for generating a GUI for switching between running applications.

When application manager 26 opens an application, application manager 26 may request buffer manager 30 perform a process that provides references to frame buffers. For instance, application manager 26 may invoke one or more methods of an Application Programming Interface (API) implemented by buffer manager 30 to request buffer manager 30 provide the references to the display buffers.

In response to a request from application manager 26, if the opened application is being newly launched, assignment module 56 of buffer manager 30 may provide to application manager 26 references to frame buffers assigned to the opened application. The reference for a frame buffer may be a virtual memory address of a first memory location of the frame buffer. Application manager 26 may, in turn, provide the references to the opened application. The opened application may then use the references for storing content data into the frame buffers. If the opened application was previously launched and is merely returning from the background, the opened application already has virtual memory addresses for the frame buffers and buffer manager 30 does not need to provide new references to the frame buffers.

As part of performing the process to assign frame buffers to the opened application, assignment module 56 may determine whether to allocate new frame buffers for the opened application. Assignment module 56 may determine whether to allocate new frame buffers for the opened application in various ways. For example, assignment module 56 may request memory management system 34 allocate new frame buffers for the opened application based on a count of applications currently assigned frame buffers being below a threshold (e.g., 10). In another example, assignment module 56 may request memory management system 34 allocate new frame buffers for the opened application based on a count of frame buffers currently assigned to applications, and other factors.

If assignment module 56 makes the determination to allocate new frame buffers for the opened application, assignment module 56 may request allocation of the new frame buffers from memory management system 34. For instance, assignment module 56 may invoke one or more methods of an API implemented by memory management system 34 to request allocation of the new frame buffers. In response to a request for allocation of memory for a frame buffer, memory management system 34 may allocate, from a pool of unallocated memory locations, physical memory locations for use as the frame buffer. Additionally, memory management system 34 may determine virtual memory addresses corresponding to the physical memory locations. Memory management system 34 may maintain an address translation table 64 that maps the virtual memory addresses to the physical memory addresses. Address translation table 64 may be implemented in special hardware for fast lookup of physical memory addresses. Memory management system 34 may return to assignment module 56 a reference to the frame buffer. The reference address may be a virtual memory address of a first memory location of the frame buffer. Assignment module 56 may then pass the reference to application manager 26, which passes the reference to the opened application.

However, if assignment module 56 makes the determination not to allocate new buffers for the opened application, assignment module 56 may determine a target buffer-retaining background application and reassign frame buffers currently assigned to the target buffer-retaining background application to the opened application. The buffer-retaining background applications are background applications that still have assigned frame buffers.

Assignment module 56 may use ML model 62 to determine a target buffer-retaining background application. For example, ML model 62 may determine claim scores for each of the buffer-retaining background applications. In this example, assignment module 56 may select the target buffer-retaining background application based on the claim scores for the buffer-retaining background applications. For example, assignment module 56 may select the target buffer-retaining background application as the buffer-retaining background application having the highest or lowest claim score. After selecting the target buffer-retaining background application, assignment module 56 may reassign the target buffer-retaining background application's frame buffers to the opened application. To reassign a frame buffer from the target buffer-retaining background application to the opened application, assignment module 56 may update address translation table 64 to associate the virtual memory addresses already used by the opened application with the physical memory addresses of memory locations storing the frame buffer.

At this point, once assignment module 56 has reassigned the target buffer-retaining background application's frame buffers to the opened application, the target buffer-retaining background application ceases to be a buffer-retaining background application and is merely a background application. Additionally, assignment module 56 may provide references to the frame buffers (e.g., virtual memory addresses) to application manager 26, which may pass the references to the opened application. In other examples, assignment module 56 passes the references directly to the opened application. In this way, the opened application may begin using the frame buffers now assigned to the opened application.

As noted above, ML model 62 may determine claim scores for the buffer-retaining background applications. In some examples, ML model 62 is implemented using one or more neural networks, support vector machines, or other types of machine learning models. In the example of FIG. 2, training module 60 automatically trains ML model 62 based on training data generating by training data collection module 58.

Training data collection module 58 may generate various types of training data. For example, the training data may include statistics regarding which applications are least likely to be foregrounded (i.e., transitioned from being in the background to being in the foreground) next when a given application is in the foreground. For instance, in this example, training data collection module 58 may determine a probability that there is a 0.25 probability of a video sharing application being the next foregrounded application when a messaging application is in the foreground, but only a 0.01 probability of a clock application being the next foregrounded application when the messaging application is in the foreground. In general, if a first application has a higher probability of being the next foregrounded application when a given application is in the foreground than a second application, ML model 62 is likely to give the first application a higher claim score than the second application (assuming that assignment module 56 selects a low-scoring buffer-retaining background application as the target buffer-retaining background application). For ease of explanation, the remainder of this disclosure follows this assumption.

In some examples, the training data may include GUI states for an application immediately before the application is backgrounded and after the application is foregrounded. In general, training module 60 trains ML model 62 to assign higher claim scores to applications that tend to have little difference between their GUIs before being backgrounded and in the first few refresh cycles after being foregrounded. This is because, for such an application, the content data stored in the frame buffers assigned to the application is likely to be reused after the application is foregrounded. Accordingly, keeping the frame buffers assigned to such an application may save time and energy in writing content data to the frame buffers when the application is foregrounded. However, if the GUI of an application before being backgrounded and after being foregrounded are likely to be substantially different, the content data stored in the frame buffers assigned to the application are unlikely to be reused after the application is foregrounded. Accordingly, there may be little point in keeping the frame buffers assigned to the application.

Furthermore, training module 60 may train ML model 62 to assign claim scores to buffer-retaining background applications based on lengths of time the buffer-retaining background applications have remained in the background. For example, ML model 62 may assign lower claim scores to buffer-retaining background applications that have remained in the background longer and higher claim scores to buffer-retaining background applications that have remained in the background for less time.

In some examples, rather than reassigning a frame buffer from a buffer-retaining background application when an application is opened, assignment module 56 may use ML model 62 to determine whether GPU-mode composition is likely to be used when the application is open. If GPU-mode composition is not likely to be used when the application is open, assignment module 56 may reassign one or more GPU-mode buffers to the application as use as frame buffers for the application. The reassignment process may work in much the same manner described above. In such examples, training data collection module 58 may collect data regarding whether GPU-mode composition is used when various applications are active. Training module 60 may use such data to train ML model 62 accordingly.

Figure 3:
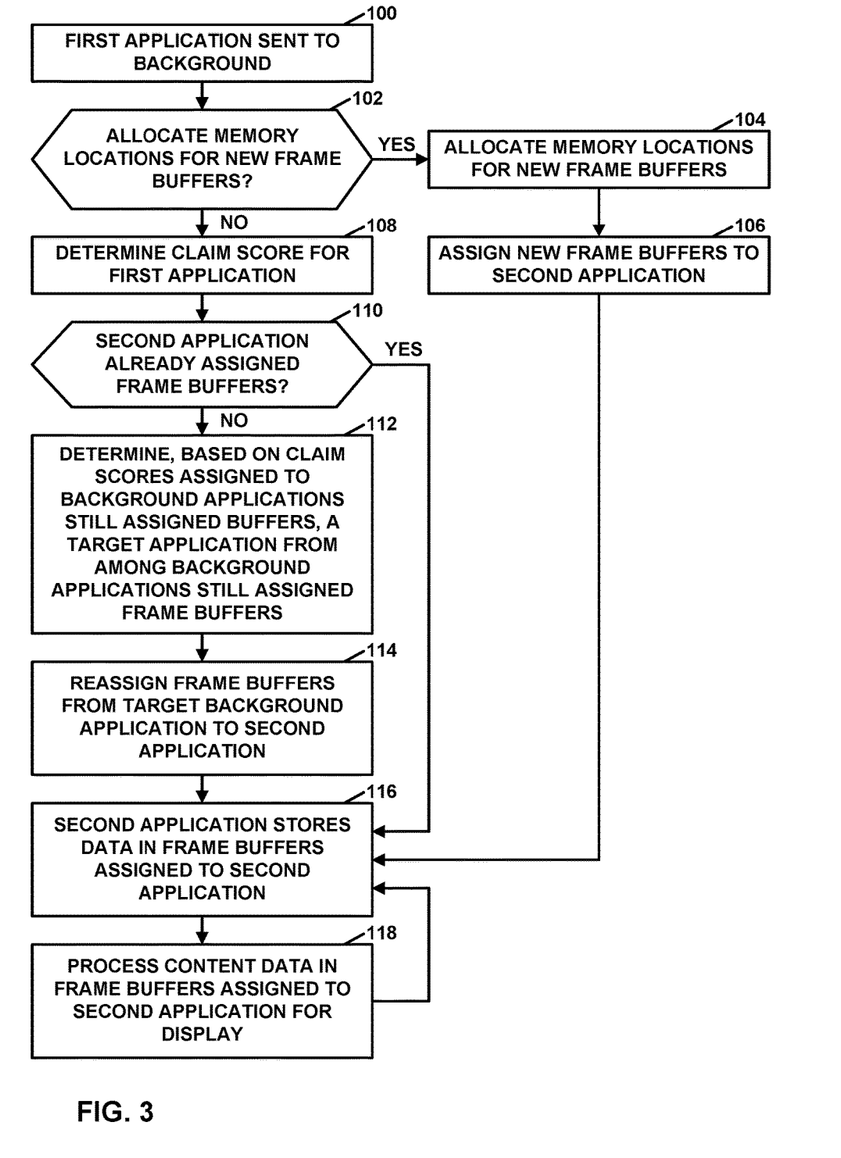
FIG. 3 is a flowchart illustrating an example operation of a device, in accordance with a technique of this disclosure that uses a probabilistic approach across applications.

FIG. 3 is a flowchart illustrating an example operation of device 10, in accordance with a technique of this disclosure that uses a probabilistic approach across applications. The flowcharts of this disclosure are provided as examples. Other examples in accordance with techniques of this disclosure may include more, fewer, or different steps.

In the example of FIG. 3, application manager 26 may send a first application to the background (100). In other words, application manager 26 may detach the first application from a display pipeline. A display pipeline generally comprises a display processor that may perform rotation, scaling, compositing, and other 2D operations. The display pipeline may also conceptually include the frame buffer and the display itself.

Application manager 26 may send the first application to the background in response to a command or other event. The command may comprise an indication of user input or may be generated within device 10 not in response to an indication of user input. For example, application manager 26 may send the first application to the background in response to receiving an indication of user input to launch a second application. In another example, application manager 26 may send the first application to the background in response to receiving an indication of user input to switch to a second application.

Furthermore, in the example of FIG. 3, assignment module 56 of buffer manager 30 may determine whether to allocate memory for new frame buffers (102). In response to making the determination to allocate memory for new frame buffers ("YES" branch of 102), memory management system 34 may allocate memory locations for the new frame buffers (104). Assignment module 56 may determine whether to allocate memory locations for new frame buffers and memory management system 34 may allocate the memory locations for the new frame buffers in accordance with examples provided elsewhere in this disclosure. Additionally, assignment module 56 may assign the new frame buffers to the second application (106). For instance, assignment module 56 may store data recording that the first application is assigned to the newly-allocated frame buffers.

Alternatively, in response to determining not to allocate memory locations for new frame buffers ("NO" branch of 102), assignment module 56 may use ML model 62 to determine a claim score for the first application (108). Assignment module 56 may use ML model 62 to determine the claim score for the first application in accordance with any of the examples provided elsewhere in this disclosure. For instance, assignment module 56 may use ML model 62 to determine claim scores for each buffer-retaining background application, including the first application. Determining claim scores for each of the buffer-retaining background applications at the time any application is sent to the background may allow for claim scores to be updated (e.g., to take into account a length of time a buffer-retaining application has remained in the background).

Additionally, in the example of FIG. 3, assignment module 56 may determine whether frame buffers have already been assigned to a second application (110). The second application is an application that application manager 26 is moving to the foreground. The frame buffers have already have been assigned to the second application if application manager 26 previously moved the second application to the background, but assignment module 56 has not reassigned the second application's frame buffers to another application.

In response to determining that frame buffers have not already been assigned to the second application ("NO"

branch of 110), assignment module 56 may determine, based on the claim scores of buffer-retaining background applications, a target application from among the buffer-retaining background applications (112). As one example of application manager 26 determining the target application from among the buffer-retaining background applications, application manager 26 may identify the buffer-retaining background application having a lowest (or highest) claim score.

Assignment module 56 may reassign frame buffers from the target application to the second application (114). For instance, assignment module 56 may store data indicating that the frame buffers are assigned to the second application. In some examples, application manager 26 sets dirty bits on the memory locations associated with the reassigned frame buffers to ensure that cached content of the frame buffers is not reused. In some examples, for security purposes, application manager 26 clears the content data stored in frame buffers when the frame buffers are reassigned in order to prevent the second application from reading potentially-sensitive data stored in the frame buffers by another application.

Furthermore, in the example of FIG. 3, after assignment module 56 assigns the frame buffers to the second application, or in response to determining that frame buffers are already assigned the second application ("YES" branch of 110), or after assigning new frame buffers to the second application (106), the second application may store content data in the frame buffers assigned to the second application (116).

Display processor 18 may process content data in the buffers assigned to the second application for display (118). For example, display processor 18 and/or GPU 14 may composite the content data with content data from application manager 26 and/or other applications to form final content data and display processor 18 may output the final content data for display on display screen 19.

Figure 4:
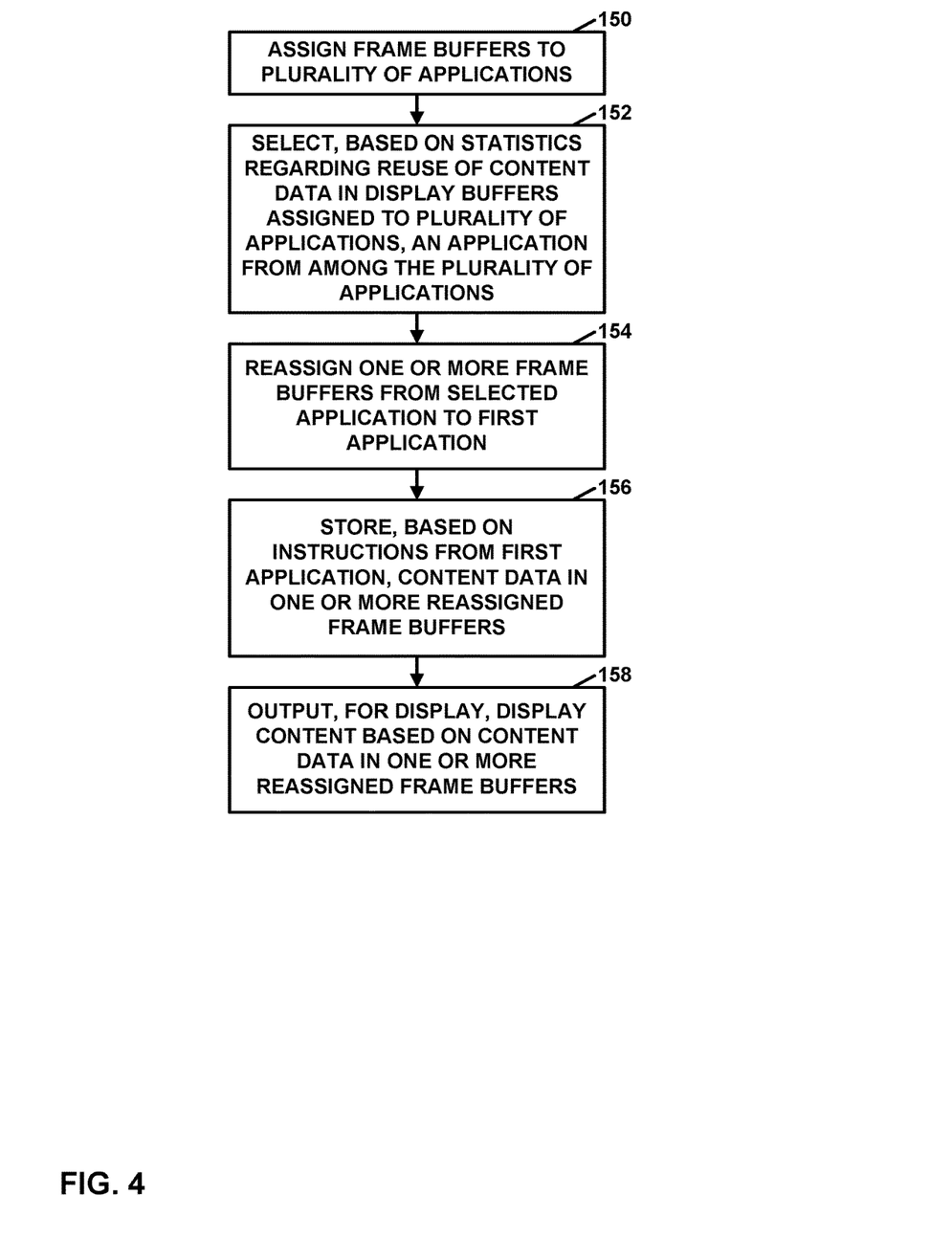
FIG. 4 is a flowchart illustrating an example operation of the device, in accordance with a technique of this disclosure.

FIG. 4 is a flowchart illustrating an example operation of device 10, in accordance with a technique of this disclosure. The example operation shown in FIG. 4 may be a distilled version of the operation of FIG. 3. As shown in the example of FIG. 4, device 10 assigns frame buffers to a plurality of applications (150). Device 10 may assign frame buffers to the plurality of applications through separate instances of buffer assignment operation, such as that shown in FIG. 3.

Furthermore, in response to a command to open a first application (e.g., the opened application) in addition to the plurality of applications, device 10 may select, based on statistics regarding reuse of content data in the frame buffers assigned to the plurality of applications, an application (e.g., the target buffer-retaining background application) from among the plurality of applications (152). For example, for each respective application in the plurality of applications, device 10 may assign, based on statistics regarding reuse of content data in frame buffers assigned to the respective application, a claim score to the respective application. In some examples, device 10 assigns the claim score to the respective application in response to the computing device detaching the respective application from a display pipeline. In some examples, device 10 assigns claim scores to each of the plurality of applications in response to the command to launch the first application. In this example, device 10 may select, based on the claim scores of the applications, the application from among the plurality of applications.

As mentioned above, device 10 may assign, based on statistics regarding reuse of content data in frame buffers assigned to the respective application, a claim score to the respective application. For example, device 10 may use a ML model (e.g., ML model 62) to determine the claim score assigned to the respective application. In this example, the ML model is trained based the statistics regarding reuse of content data in the frame buffers assigned to the respective application. In some examples, the statistics include data regarding a probability of the respective application being a next one of the plurality of applications to be relaunched when the first application is attached to the display pipeline. In some examples, the statistics include how much time has elapsed follow a most recent time content data was rendered in the frame buffers assigned to the respective application. In some examples, the statistics include a probability of a next state of a graphical user interface (GUI) of the respective application and statistics regarding a size of a rendering area of the next state of the GUI of the respective application.

Device 10 may reassign one or more of the frame buffers from the selected application to the first application (154). In some examples, device 10 reassigns the frame buffers by modifying mappings of virtual memory addresses to physical memory addresses, as described elsewhere in this disclosure. The reassigned frame buffers may be GPU-mode buffers, GPU-utilized frame buffers, or non-GPU-utilized frame buffers. Device 10 may store, based on instructions of the first application, content data in the one or more reassigned frame buffers (156). For instance, execution of software instructions of the first application by processor 12 and/or GPU 14, may cause device 10 to store the content data in the one or more reassigned frame buffers.

Although not shown in the example of FIG. 4, device 10 may, in response to the one or more frame buffers being reassigned to the first application, allocate memory locations from a free memory pool (e.g., free memory pool 32). Additionally, in such examples, device 10 may assign the allocated memory locations to the selected application as frame buffers for the selected application.

Additionally, in the example of FIG. 4, device 10 may output for display on a display screen (e.g., display screen 19 or another local or remote display screen), display content (e.g., pixel values) based on the content data in the one or more reassigned frame buffers (158). For example, device 10 may output, to the display screen, content data composited from the content data in the one or more reassigned frame buffers. In some examples, device 10 may output, to the display screen, the content data in the one or more reassigned frame buffers.

Figure 5:
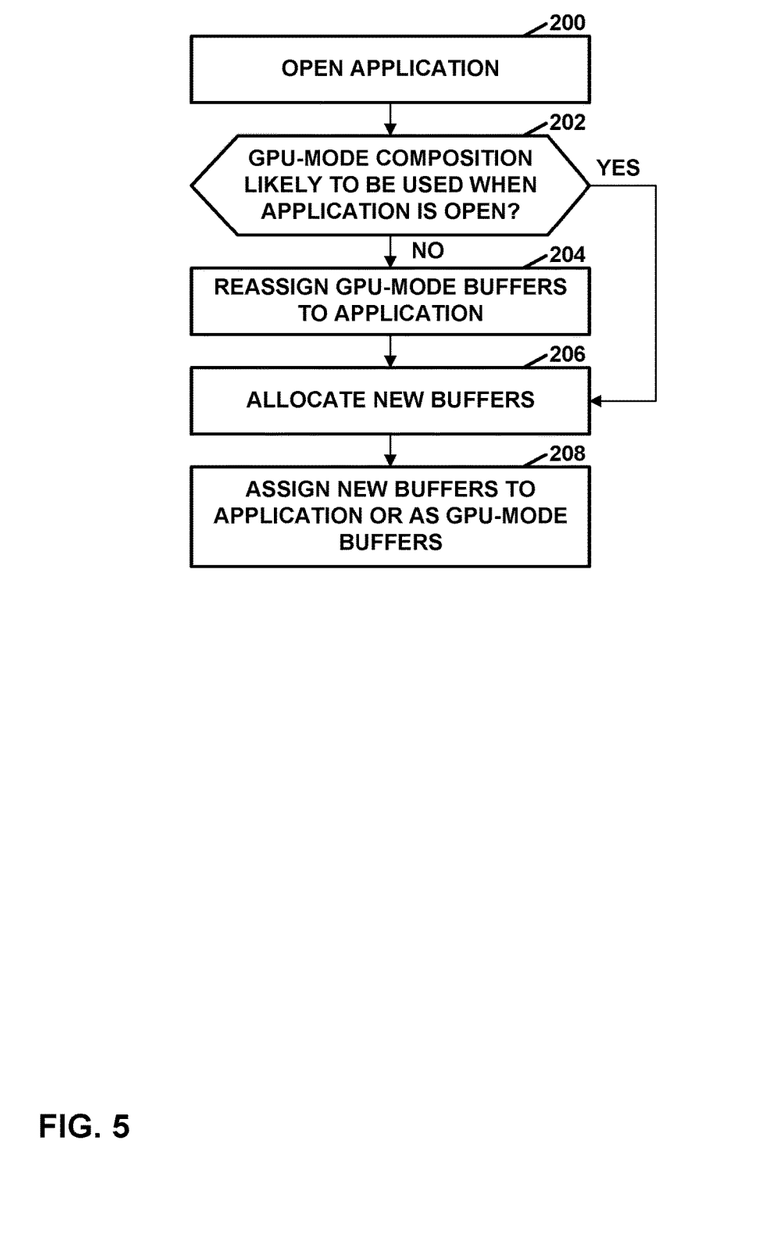
FIG. 5 is a flowchart illustrating an example operation of the device, in accordance with a technique of this disclosure that uses a probabilistic approach within a display subsystem.

FIG. 5 is a flowchart illustrating an example operation of the device, in accordance with a technique of this disclosure that uses a probabilistic approach within a display subsystem. In the example of FIG. 5, application manager 26 may receive a request to open an application (200). For example, application manager 26 may receive a request to launch the application or return the application from the background.

In response, buffer manager 30 may determine whether GPU-mode composition is likely to be used when the application is open (202). For instance, buffer manager 30 may use ML model 62 to determine whether GPU-mode composition is likely to be used when the application is open, as described elsewhere in this disclosure. In some examples, buffer manager 30 may determine whether a probability that GPU-mode composition will be used when the application is open is below a threshold (e.g., 0.1). In response to determining that GPU-mode composition is not likely to be used when the application is open ("NO" branch of 202), buffer manager 30 may reassign one or more GPU-mode buffers to the application (204). Buffer manager 30 may reassign the GPU-mode buffers by changing address translation table 64, as described elsewhere in this disclosure. As a result of the reassignment, the GPU-mode buffers are available for use as normal frame buffers for the application. Subsequently, the application may begin writing content data into the frame buffers.

In addition to reassigning the GPU-mode buffers, or as a result of determining that GPU-mode composition is likely to be used when the application is open ("YES" branch of 202), buffer manager 30 may allocate new buffers (206). Buffer manager 30 may use memory management system 34 to allocate the new buffers. Subsequently, buffer manager 30 may assign the new buffers to the application in place of the previously GPU-mode buffers or may assign the new buffers for use a GPU-mode buffers (208).

Figure 6:
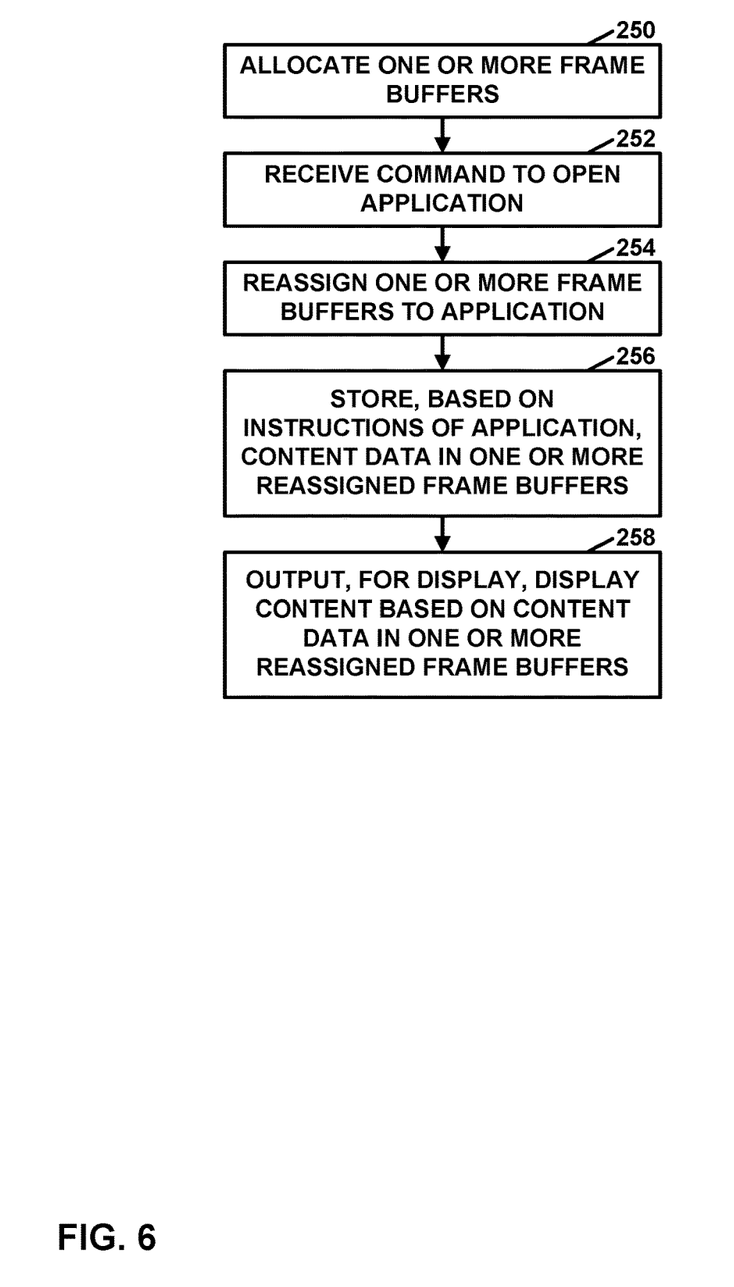
FIG. 6 is a flowchart illustrating an example operation of the device, in accordance with a technique of this disclosure.

FIG. 6 is a flowchart illustrating an example operation of device 10, in accordance with a technique of this disclosure. The operation of FIG. 6 may be general to both a probabilistic approach across applications and a probabilistic approach within a display subsystem. In the example of FIG. 6, device 10 may allocate one or more frame buffers (250). The frame buffers may be assigned to applications or may be GPU-mode buffers. Furthermore, device 10 may receive a command to open an application after allocating the one or more frame buffers (252). For instance, application manager 26 may receive an indication of user input to launch the application or return the application from the background. In response to the command to open the application, device 10 may reassign one or more of the frame buffers to the application (254). For instance, device 10 may go through a process such as that described above (e.g., with respect to the operations of FIG. 3, FIG. 4, and FIG. 5) to determine how to reassign the frame buffers.

Subsequently, device 10 may store, based on instructions of the application, content data in the one or more reassigned frame buffers (256). Device 10 may output, for display on a display screen, content based on the content data in the one or more reassigned frame buffers (258). Device 10 may store the content data and output the content data in accordance with any of the examples provided elsewhere in this disclosure.

In this disclosure, ordinal terms such as "first," "second," "third," and so on, are not necessarily indicators of positions within an order, but rather may simply be used to distinguish different instances of the same thing. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   allocating, by a computing device, a plurality of frame buffers;
   assigning, by the computing device, the plurality of frame buffers to a plurality of applications that includes a first application;
   selecting, by the computing device, based on statistics regarding reuse of content data in the frame buffers assigned to the plurality of applications, the first application from among the plurality of applications; and
   in response to a command to open a second application after allocating the one or more frame buffers to the first application:
      based on the first application being selected, reassigning, by the computing device, while the first application is still running, the one or more frame buffers assigned to the first application to the second application;
      storing, by the computing device, based on instructions of the second application, content data in the one or more reassigned frame buffers; and
      outputting, by the computing device for display on a display screen, content based on the content data in the one or more reassigned frame buffers.

2. The method of claim 1,
   further comprising: for each respective application in the plurality of applications, assigning, by the computing device, based on statistics regarding reuse of content data in frame buffers assigned to the respective application, a claim score to the respective application; and
   wherein selecting the first application from among the plurality of applications comprises selecting, by the computing device, based on the claim scores of the applications, the first application from among the plurality of applications.

3. The method of claim 2, wherein the computing device assigns the claim score to the respective application in response to the computing device detaching the respective application from a display pipeline.

4. The method of claim 2, wherein assigning the claim score to the respective application comprises:
   using, by the computing device, a machine learning model to determine the claim score assigned to the respective application, wherein the machine learning model is trained based on the statistics regarding reuse of content data in the frame buffers assigned to the respective application.

5. The method of claim 4, wherein the statistics include data regarding a probability of the respective application being a next one of the plurality of applications to be relaunched when the second application is attached to the display pipeline.

6. The method of claim 4, wherein the statistics include how much time has elapsed following a most recent time content data was rendered in the frame buffers assigned to the respective application.

7. The method of claim 4, wherein the statistics include a probability of a next state of a graphical user interface (GUI) of the respective application and statistics regarding a size of a rendering area of the next state of the GUI of the respective application.

8. The method of claim 1, further comprising:
   in response to the one or more frame buffers being reassigned to the second application, allocating, by the computing device, memory locations from a free memory pool; and
   assigning, by the computing device, the allocated memory locations to the first application as frame buffers for the first application.

9. The method of claim 1, wherein:
   prior to being reassigned, the one or more reassigned frame buffers are Graphics Processing Unit (GPU)-mode buffers,
   the method further comprises determining, by the computing device, whether a probability that GPU-mode composition will be used when the second application is open is below a threshold, and
   reassigning the one or more frame buffers to the second application comprises reassigning, by the computing device, the one or more frame buffers assigned to the first application to the second application in response to determining that the probability that GPU-mode composition will be used when the second application is open is below the threshold.

10. A device comprising:
    a memory; and
    processing circuitry configured to:
       allocate a plurality of frame buffers;
       assign the plurality of frame buffers to a plurality of applications that includes a first application;
       select, based on statistics regarding reuse of content data in the frame buffers assigned to the plurality of applications, the first application from among the plurality of applications; and
       in response to a command to open a second application after allocating the one or more frame buffers to the first application:
          based on the first application being selected, while the first application is still running, reassign the one or more frame buffers assigned to the first application to the second application;
          store, based on instructions of the second application, content data in the one or more reassigned frame buffers; and
          output, for display on a display screen, content based on the content data in the one or more reassigned frame buffers.

11. The device of claim 10,
    wherein the processing circuitry is further configured to:
       for each respective application in the plurality of applications, assign, based on statistics regarding reuse of content data in frame buffers assigned to the respective application, a claim score to the respective application; and
    wherein the processing circuitry is configured such that, as part of selecting the first application from among the plurality of applications, the processing circuitry selects, based on the claim scores of the applications, the first application from among the plurality of applications.

12. The device of claim 11, wherein the processing circuitry assigns the claim score to the respective application in response to the processing circuitry detaching the respective application from a display pipeline.

13. The device of claim 11, wherein the processing circuitry is configured such that, as part of assigning the claim score to the respective application, the processing circuitry:
uses a machine learning model to determine the claim score assigned to the respective application, wherein the machine learning model is trained based on the statistics regarding reuse of content data in the frame buffers assigned to the respective application.

14. The device of claim 13, wherein the statistics include data regarding a probability of the respective application being a next one of the plurality of applications to be relaunched when the second application is attached to the display pipeline.

15. The device of claim 13, wherein the statistics include how much time has elapsed following a most recent time content data was rendered in the frame buffers assigned to the respective application.

16. The device of claim 13, wherein the statistics include a probability of a next state of a graphical user interface (GUI) of the respective application and statistics regarding a size of a rendering area of the next state of the GUI of the respective application.

17. The device of claim 10, wherein the processing circuitry is further configured to:
in response to the one or more frame buffers being reassigned to the second application, allocate, memory locations from a free memory pool; and
assign the allocated memory locations to the first application as frame buffers for the first application.

18. The device of claim 10, wherein:
prior to being reassigned, the one or more reassigned frame buffers are Graphics Processing Unit (GPU)-mode buffers,
the processing circuitry is further configured to determine whether a probability that GPU-mode composition will be used when the second application is open is below a threshold, and
wherein the processing circuitry is configured such that, as part of reassigning the one or more frame buffers assigned to the first application to the second application, the processing circuitry reassigns the one or more frame buffers to the second application in response to determining that the probability that GPU-mode composition will be used when the second application is open is below the threshold.

19. A device comprising:
means for allocating a plurality of frame buffers;
means for assigning the plurality of frame buffers to a plurality of applications that includes a first application;
means for selecting, based on statistics regarding reuse of content data in the frame buffers assigned to the plurality of applications, the first application from among the plurality of applications; and
means for, in response to a command to open a second application after allocating the one or more frame buffers to the first application:
based on the first application being selected and while the first application is still running, reassigning the one or more frame buffers assigned to the first application to the second application;
storing based on instructions of the second application, content data in the one or more reassigned frame buffers; and
outputting, for display on a display screen, content based on the content data in the one or more reassigned frame buffers.

20. The device of claim 19, wherein:
prior to being reassigned, the one or more reassigned frame buffers are Graphics Processing Unit (GPU)-mode buffers,
the device further comprises means for determining whether a probability that GPU-mode composition will be used when the second application is open is below a threshold, and
reassigning the one or more frame buffers to the second application comprises reassigning, by the computing device, the one or more frame buffers assigned to the first application to the second application in response to determining that the probability that GPU-mode composition will be used when the second application is open is below the threshold.

21. A computer-readable data storage medium having instructions stored thereon that, when executed, cause a device to:
allocate a plurality of frame buffers;
assign the plurality of frame buffers to a plurality of applications that includes a first application;
select, based on statistics regarding reuse of content data in the frame buffers assigned to the plurality of applications, the first application from among the plurality of applications; and
in response to a command to open a second application after allocating the one or more frame buffers to the first application:
based on the first application being selected and while the first application is still running, reassign the one or more frame buffers assigned to the first application to the second application;
store, based on instructions of the second application, content data in the one or more reassigned frame buffers; and
output, for display on a display screen, content based on the content data in the one or more reassigned frame buffers.

22. The computer-readable data storage medium of claim 21, wherein:
prior to being reassigned, the one or more reassigned frame buffers are Graphics Processing Unit (GPU)-mode buffers,
execution of the instructions further causes the device to determine whether a probability that GPU-mode composition will be used when the second application is open is below a threshold, and
as part of causing the device to reassign the one or more frame buffers to the second application, execution of the instructions causes the second device to reassign the one or more frame buffers to the second application in response to determining that the probability that GPU-mode composition will be used when the second application is open is below the threshold.

* * * * *